United States Patent [19]
Johnson et al.

[11] 3,788,684
[45] Jan. 29, 1974

[54] REMOVABLE GRAIN BODY SIDES FOR FLAT LOAD BED

[76] Inventors: Davis O. Johnson; Terry Lee, P.O. Box 235, both of Hayti, S. Dak. 57241

[22] Filed: Mar. 30, 1972

[21] Appl. No.: 239,448

[52] U.S. Cl........................ 296/36, 52/243, 52/495, 105/382, 296/43
[51] Int. Cl............................................ B62d 27/06
[58] Field of Search....... 296/10, 28 M, 36, 43, 104; 280/147; 105/380, 382, 386, 390; 52/243, 495; 248/44, 361 R

[56] References Cited
UNITED STATES PATENTS

| | | | |
|---|---|---|---|
| 3,097,880 | 7/1963 | Reader................................ | 296/36 |
| 1,208,182 | 12/1916 | Martin................................. | 296/36 |
| 3,010,755 | 11/1961 | Black.............................. | 296/28 M |
| 2,915,151 | 12/1959 | Kekenak............................. | 52/495 |
| 3,486,785 | 12/1969 | Corson........................... | 248/361 R |
| 3,692,354 | 9/1972 | Tuerk................................. | 296/36 |
| 704,926 | 7/1902 | Roberts............................... | 296/36 |
| 1,403,307 | 1/1922 | Fisher................................. | 296/10 |
| 679,539 | 7/1901 | Nosal.................................. | 296/36 |
| 3,266,837 | 8/1966 | Stricker, Jr. et al. ............ | 296/28 M |

*Primary Examiner*—Kenneth H. Betts
*Assistant Examiner*—Leslie J. Paperner
*Attorney, Agent, or Firm*—Harvey B. Jacobson; Clarence A. O'Brien

[57] ABSTRACT

A side wall assembly for a flat load bed of the type including longitudinally spaced upwardly opening opposite side mounting pockets. The assembly consists of upstanding stakes downwardly seatable in the pockets and provided with laterally projecting downwardly opening upper end hook portions, spring-type readily releasable anchors for securing the stakes in the pockets and body side panels removably positionable against the inner sides of the stakes and over whose upper marginal edge portions the stake hook portions are engaged.

10 Claims, 8 Drawing Figures

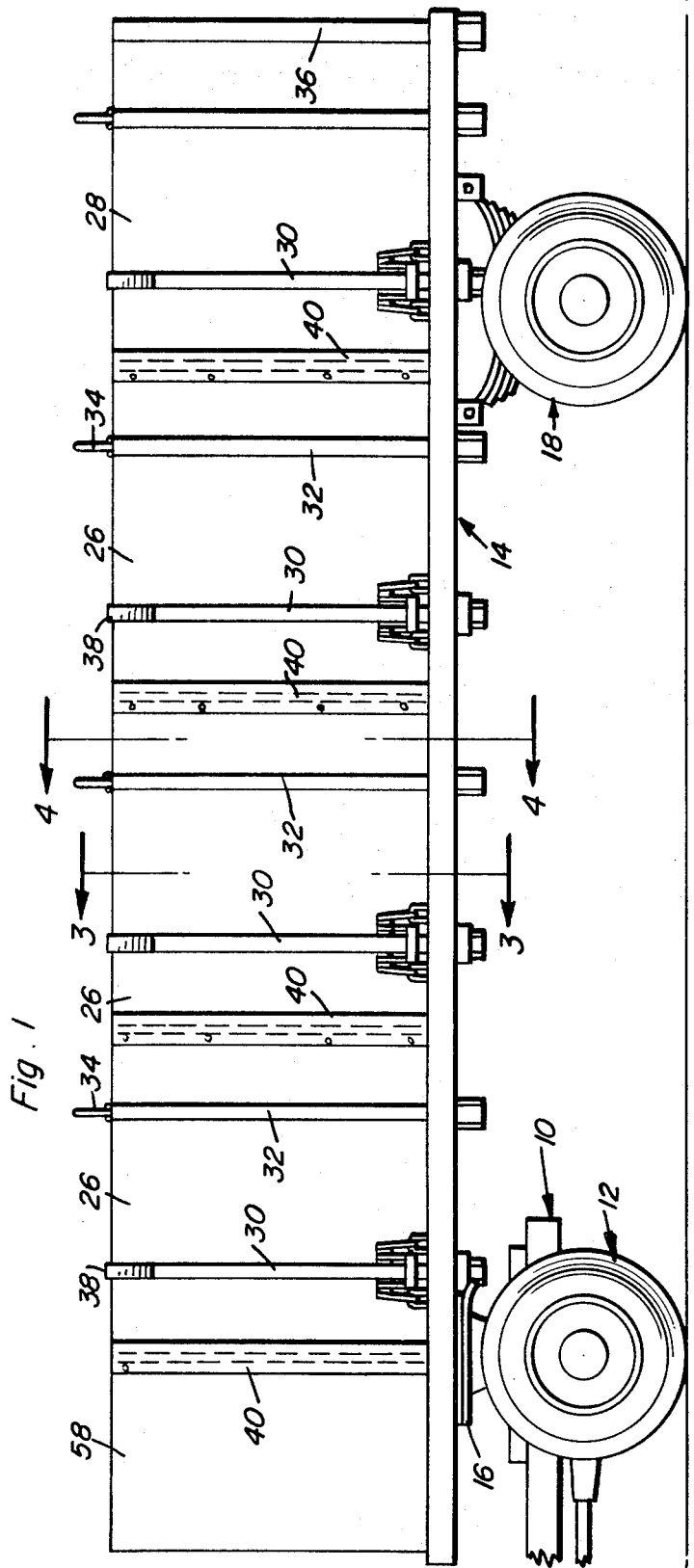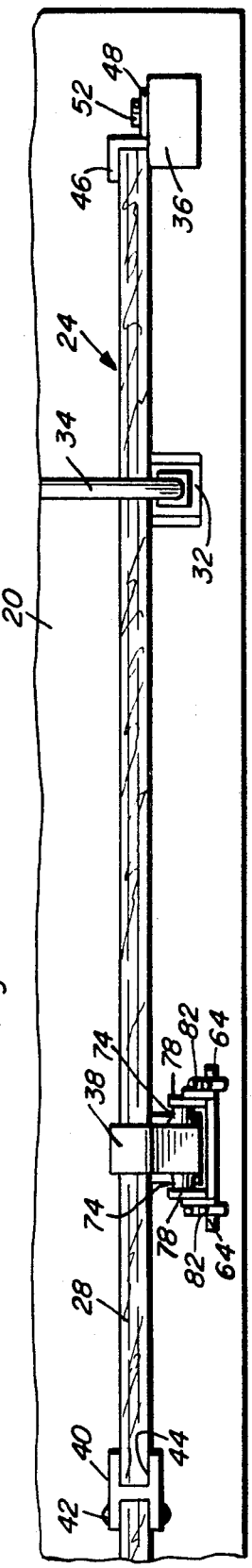

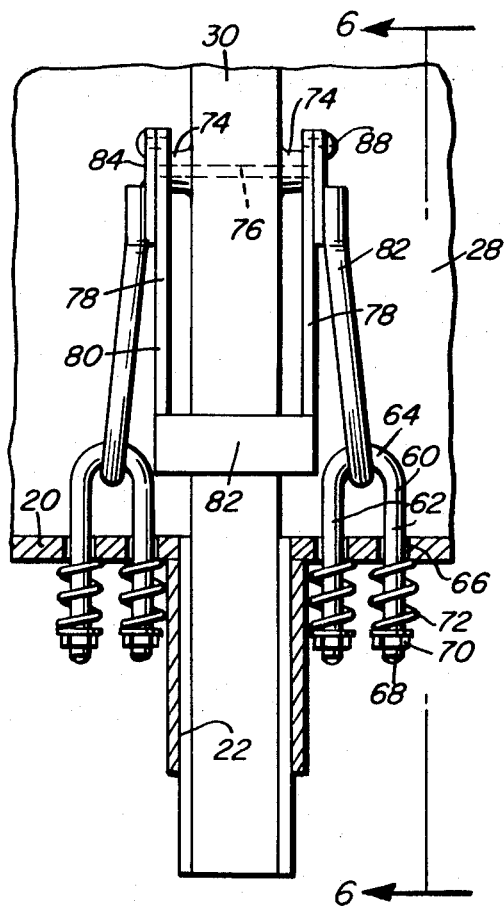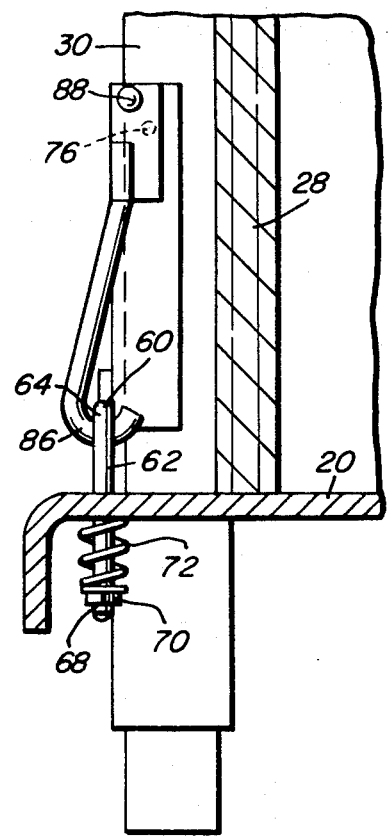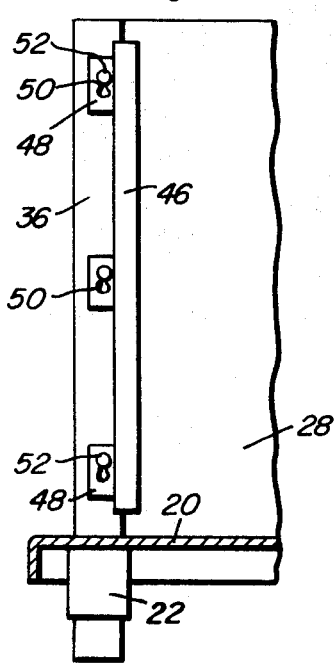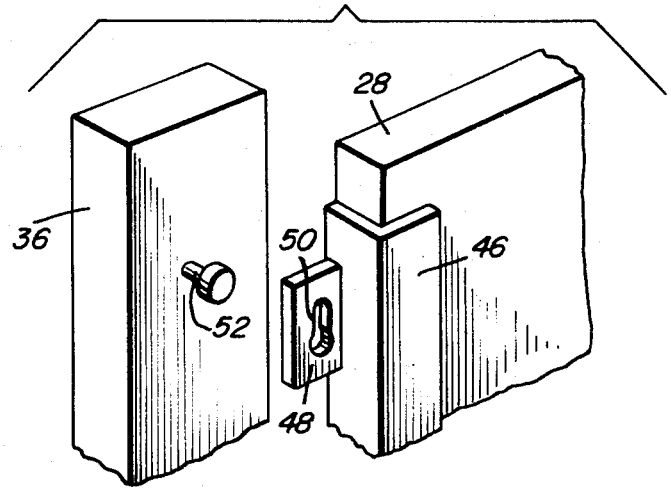

REMOVABLE GRAIN BODY SIDES FOR FLAT LOAD BED

Heretofore semi-trailers of the flat bed type have been utilized as dual purpose vehicles and various forms of removable side walls have been designed to convert a flat bed semi-trailer into a sided load bed for receiving granular materials such as grain. However, most side wall assemblies heretofore provided for converting a flat bed semi-trailer into a grain trailer have utilized complex or inefficient side wall structures for accomplishing the conversion. When complex side wall structures are utilized considerable time is spent in erecting the side walls and dismantling the side walls. On the other hand, more quickly assembled and disassembled side wall structures have been found to be inherently weak, loose fitting in relation to adjacent parts whereby grain leakage occurs or unsatisfactory in other areas.

It is accordingly the main object of this invention to provide a convertible flat bed wherein an upwardly opening grain bin may be formed on the flat bed with a minimum of effort and in an extremely short period of time.

Another object of this invention, in accordance with the immediately preceding object, is to provide a knock-down side wall assembly for a flat load bed and constructed in a manner whereby when the side wall assembly is erected an extremely tight fit between the various adjacent components of the side wall assembly will be afforded.

Still another object of this invention is to provide a side wall assembly for a flat load bed and including structural features enabling the side wall assembly to be fully erected or disassembled without the use of tools.

A still further important object of this invention is to provide a side wall assembly utilizing top bows for interconnecting and bracing opposite side wall portions of the assembly.

Another object of this invention, in accordance with the immediately preceding object, is to provide top bow structures removably engageable with corresponding portions of the opposite side wall structures in a manner such that the bows may be readily removed and adequately retained in operative position by means of a tarpaulin secured over the load bed.

A final object of this invention to be specifically enumerated herein is to provide a removable grain body side construction for flat load beds and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a side elevational view of a conventional form of semi-trailer of the flat bed type and with the removable grain body side assembly of the instant invention operatively associated with the flat bed in order to form an upwardly opening grain bin;

FIG. 2 is a fragmentary top plan view of the near side portion of the rear end of the semi-trailer illustrated in FIG. 1;

FIG. 5 is a fragmentary enlarged side elevational view of the flat bed with parts thereof illustrated in vertical section and disclosing the manner in which spring anchors are utilized to secure the stake portions of the side wall assembly in the flat bed sockets;

FIG. 6 is a fragmentary vertical sectional view taken substantially upon the plane indicated by the section line 6—6 of FIG. 5;

FIG. 7 is a fragmentary elevational view of the rear end of the near side of the side wall assembly illustrated in FIG. 1 as seen from the inside thereof and illustrating the manner in which the rear end of the rearmost side wall panel is secured in position; and FIG. 8 is a fragmentary exploded perspective view of the rear side wall anchoring structure illustrated in FIG. 7.

Figure 3:
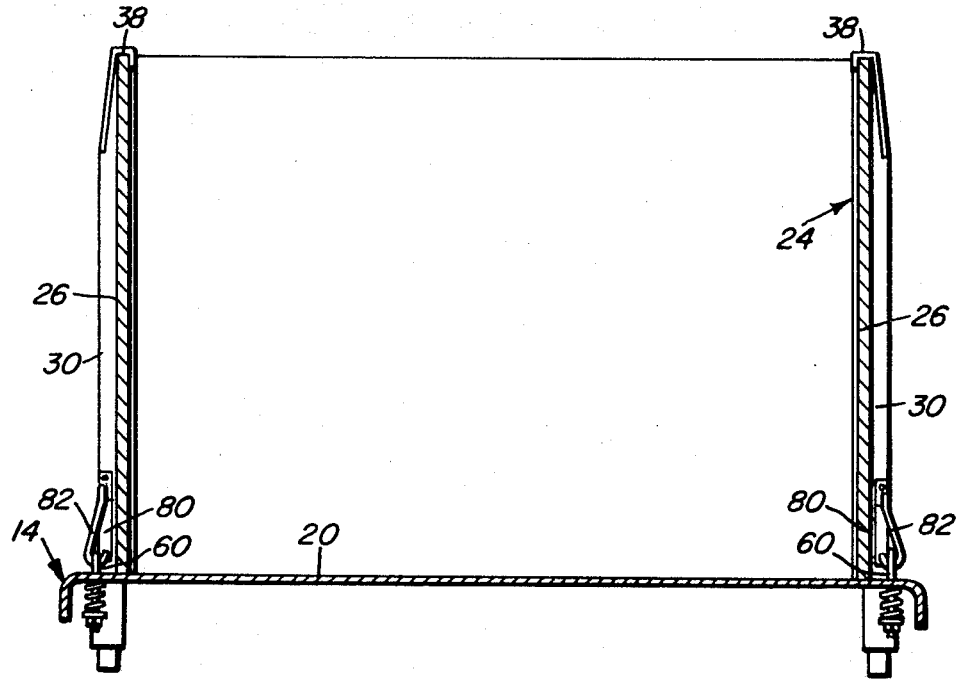
FIG. 3 is a transverse vertical sectional view taken substantially upon the plane indicated by the section line 3—3 of FIG. 1.
Figure 4:
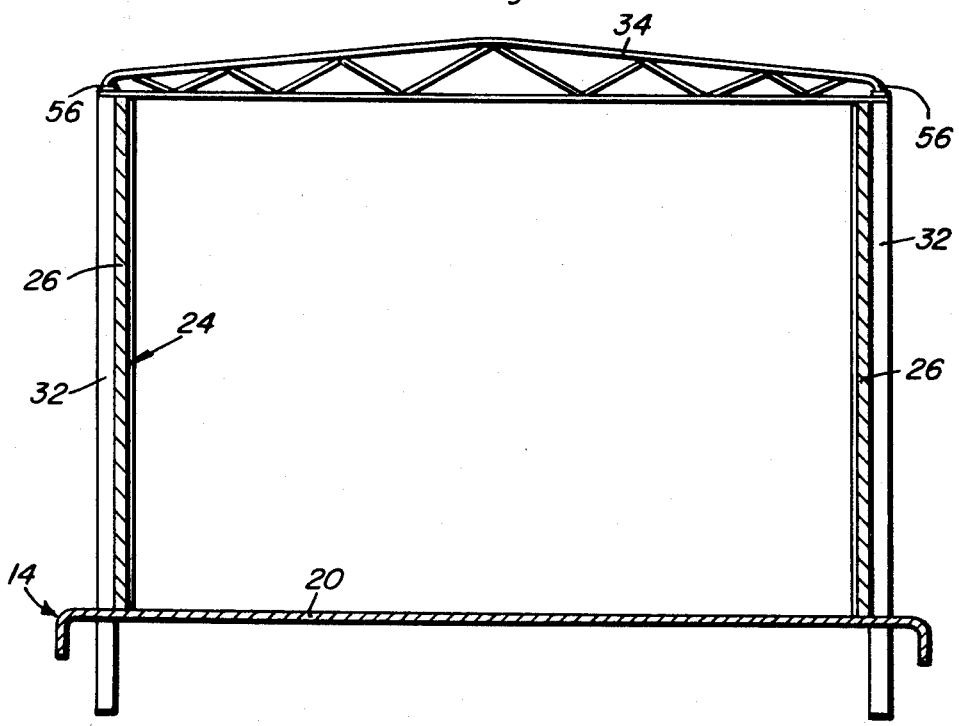
FIG. 4 is a transverse vertical sectional view taken substantially upon the plane indicated by the section line 4—4 of FIG. 1.

Referring now more specifically to the drawings, the numeral 10 generally designates a conventional form of vehicle comprising a tractor-trailer vehicle including a tractor referred to in general by the reference numeral 12 and a semi-trailer referred to in general by the reference numeral 14 connected to the tractor by means of a conventional fifth wheel assembly referred to in general by the reference numeral 16.

The semi-trailer 14 is conventional in design in that it includes sprung rear running gear 18 and a flat load bed 20 including longitudinally spaced upwardly opening opposite side pockets or sockets 22. Substantially all semi-trailers of the flat bed type are provided with these pockets 22 whereby upstanding longitudinally spaced stakes can be removably supported from the load bed 20 in order to retain loads disposed thereon.

The removable grain body side structure of the instant invention is referred to in general by the reference numeral 24 and includes upstanding side wall panels 26 and 28, side panel anchoring stakes 30, top bow supporting stakes 32, top bows 34 and rear stakes 36.

With the assumption that the stakes 32 are disposed in position, the forwardmost side wall panel 26 may be placed against the inside surface of the forwardmost stake 32 and thereafter the forwardmost stake 30 may have its lower end downwardly inserted into the corresponding socket or pocket 22. Each stake 30 includes a laterally inwardly projecting and downwardly opening upper end hook 38 which snugly embraces the adjacent upper marginal edge portion of the forwardmost side wall panel 26.

The rear marginal edge portion of each side wall panel 26 has a double channel member 40 secured thereto by means of suitable fasteners 42 and each channel or channel member 40 defines a rearwardly opening channel 44 in which to recieve the forward upstanding edge portion of the next rear side wall panel 26. Accordingly, the second side wall panel 26 is moved into position with its forward upstanding marginal edge portion seated in the channel 44 with the second side wall panel 26 aligned with the first erected panel 26. Thereafter, the corresponding stake 30 may be placed in position. Then, the rearmost side wall panel 26 is placed in position in the same manner and the rear side wall panel 28 is thereafter placed in position in a similar manner. However, with attention invited more specifically to FIGS. 2, 7 and 8 of the drawings, it will be noted that the rear upstanding marginal edge portion of the rear side wall panel 28 has an angle member 46 secured thereto in any convenient manner. The angle member 46 is provided with three vertically spaced outstanding ears 48 provided with inverted keyhole openings 50 and the rearmost stake 36 is provided with inwardly directed outstanding headed shank portions 52 with which the ears 48 are engageable. In this manner, the rearmost side wall panels 28 on opposite sides of the load bed 20 may be braced against laterally deflection.

With attention now invited more specifically to FIGS. 2 and 3 of the drawings, it may be seen that each of the stakes 32 is tubular and opens upwardly. Each of the top bows 34 includes downturned opposite ends 56 which are downwardly telescopingly receivable within the upper ends of the corresponding stakes 32. Accordingly, after all of the side wall panels 26 and 28 have been erected, the top bows 34 may be downwardly displaced into position so as to brace the side wall panels 26 and 28 intermediate adjacent stakes 30. When a covering tarpaulin (not shown) is secured over the top bows 34, the latter are retained in position against upward displacement relative to the stakes 32. Further, the opposite ends of the load bed defined by the side wall assembly 24 may be closed in any convenient manner (not shown). In addition, each side wall assembly may include a front end side wall panel 58 whose forward marginal portion may be anchored in any convenient manner (not shown) and whose rear marginal edge portion includes a further double channel member 40 for embracingly receiving the forward upstanding marginal edge portion of the corresponding side wall panel 26.

The load bed 20 is provided with longitudinally spaced pairs of inverted U-shaped anchor members 60 with each pair of anchor members 60 disposed on opposite sides of the corresponding pocket 22. Each anchor member 60 includes a pair of depending legs 62 interconnected at their upper ends by means of an integral downwardly opening semi-circular bight portion 64 and the lower ends of the legs 62 are loosely slidably received through vertical bores 66 provided therefor in the load bed 20. The lower end portions of the legs 62 are externally threaded as at 68 and have threaded retainers 70 threadedly engaged thereon. A compression spring 71 is disposed on each leg 62 between the undersurface of the load bed 20 and the corresponding fastener 70. Therefore, the anchor members 60 are yieldingly urged downwardly by the compression springs 72 from their uppermost limit positions.

Each of the stakes 30 includes a pair of front and rear extending bosses 74 through which the opposite ends of a corresponding pivot pin 76 are rotatably journalled. The upper ends of the legs 78 of a U-shaped lever 80 including a lower hand-engageable bight portion 82 extending between the lower ends of the legs 78 are secured to the opposite ends of the pivot pin 76 and a pair of elongated hooked tension members 82 provided with plate-like upper ends 84 and hook-shaped lower ends 86 have their upper ends 84 pivotally secured to the upper ends of the legs 78 by means of pivot fasteners 88. It will be noted from FIG. 6 of the drawings that the pivot fasteners 88 are disposed in outwardly displaced over-center positions when the lever 80 has its lower end swung inwardly into abutting engagement with the outer surface of the corresponding stake 30.

After all of the side wall portions have been erected each lever 80 then has the lower bight portion 82 thereof swung outwardly and upwardly away from the corresponding stake 30 so as to lower the hooked lower ends of the tension members 82 for engagement with the closed upper ends of the anchor members 60. After the hooked lower ends 86 of the tension members 82 have been engaged with the corresponding anchor members 60, the free ends of the levers 80 are then swung downwardly and inwardly to the over-center position illustrated in FIG. 6 whereby the upper ends of the tension members 82 will be elevated thus causing the anchor members 60 to be shifted upwardly relative to the load bed 20 against the biasing action of the corresponding springs 72. In this manner, each of the stakes 30 is strongly biased downwardly in order that the hooked upper ends of the stakes 30 may exert downward forces upon the side wall portions 26 and 28.

Inasmuch as the stakes 32 serve only to back the outer sides of the side wall panels 26 and 28 intermediate the stakes 30 and to support the bows 34, the stakes 32 are constructed so as to bottom in the corresponding sockets. However, the stakes 30 do not bottom in the sockets 22 but are merely downwardly biased toward bottoming positions above which the stakes 30 are maintained by the engagement of the hooked upper ends thereof with the upper marginal edge portions of the side wall panels 26 and 28.

Because of the tight fit between the forward marginal edge portions of the panels 26 and 28 in the channels 44 and the manner in which the lower marginal edge portions of the panels 26 and 28 are maintained in tight engagement with the upper surfaces of the load bed 20, an extremely tight grain bin may be provided on the semi-trailer 14. In addition, because of the bracing afforded by the stakes 32 and bows 34 on the side wall panels 26 and 28, the side wall assemblies are prevented from "working" and a durable structure is therefore provided.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a flat load bed including opposite side longitudinally spaced upwardly opening vertically elongated sockets, a plurality of upstanding stakes having their lower ends snugly removably downwardly telescoped in said sockets, opposite side longitudinally extending side wall panel means disposed in edge upstanding relation along and closely opposing the inner side surfaces of said stakes, the upper ends of said stakes including inwardly laterally projecting downwardly facing abutment means overlying the upper marginal edges of said wall panel means at points spaced longitudinally therealong, and readily releasable coacting tension anchor means connected between said load bed and said stakes yieldingly biasing the latter toward lower positions in said sockets, said coacting tension anchor means including anchor portions carried by said load bed and disposed adjacent said pockets at points spaced along said load bed, tension arms having one set of arms releasably engageable with said anchor portions and the other set of ends thereof pivotally attached to actuating levers pivotally supported from said stakes for movement between first operative positions and second inoperative positions, said other set of ends of said tension arms being disposed in over-center positions relative to the pivot axes of said levers when the latter are in their operative positions, said anchor portions being supported from said load bed for vertical shifting relative thereto and are spring biased toward lower positions relative to said load bed.

2. The combination of claim 1 wherein said side wall panel means includes a plurality of edge aligned wall panel sections spaced along each side edge of said load bed, each of said wall panel sections having at least one of said stakes operatively associated therewith.

3. The combination of claim 1 including an end stake disposed at one end of one of said side wall panel means, said stake including inwardly projecting vertically spaced headed shank portions, said one end of said one side wall panel means including means defining inverted transversely extending keyhole openings in whose narrow upper ends said shank portions are seated with the heads of said shank portions spaced inwardly of the inner ends of said keyhole openings.

4. The combination of claim 1 wherein said anchor portions define anchor eyes and said one set of ends of said tension arms are hooked for releasable engagement with said anchor eyes.

5. The combination of claim 1 wherein said abutment means comprises downwardly opening hooked portions of said stakes embracingly engaging the corresponding upper marginal edge portions of said side wall panel means.

6. The combination of claim 5 wherein said side wall panel means includes a plurality of edge aligned wall panel sections spaced along each side edge of said load bed, each of said wall panel sections having at least one of said stakes operatively associated therewith.

7. The combination of claim 6 wherein at least one upstanding edge of each pair of opposing edges of adjacent panel sections includes means defining an edge outwardly opening channel in which the opposing edge of the adjacent panel section is embracingly received.

8. The combination of claim 1 including additional stakes disposed between each adjacent pair of the first mentioned stakes, said load bed including additional opposite side pockets in which the lower ends of said additional stakes are seated, said side wall panel means also abutting the inner sides of said additional stakes, and removable transverse top bows supported from and extending between the upper ends of corresponding additional stakes disposed on opposite sides of said load bed.

9. The combination of claim 8 wherein said side wall panel means includes a plurality of edge aligned wall panel sections spaced along each side edge of said load bed, each of said wall panel sections having at least one of said stakes operatively associated therewith.

10. The combination of claim 9 wherein said abutment means comprises downwardly opening hooked portions of said stakes embracingly engaging the corresponding upper marginal edge portions of said side wall panel means.

* * * * *